United States Patent Office 2,995,584
Patented Aug. 8, 1961

2,995,584
ANTHRAQUINONYL SULFONES AND PRODUCTION THEREOF
Erwin Klingsberg, Mountainside, N.J., assignor to American Cyanamid Company, New York, N.Y., a corporation of Maine
No Drawing. Filed Dec. 2, 1958, Ser. No. 777,559
11 Claims. (Cl. 260—370)

This invention relates to a new process for the preparation of aryl anthraquinonyl sulfones, comprising the heating of a halogeno anthraquinone with a sulfinate salt in a high boiling organic solvent above 180° C. This invention also relates to new aryl anthraquinonyl sulfones, free of water solubilizing groups, in which the aryl group is an aromatic radical selected from carbocyclic radicals of less than three 6-membered rings, thienyl and dibenzothipheneyl. These new compounds are useful as vat dyes or as intermediates for vat and azo dyes.

The reaction of a halogeno organic compound with a sulfinate salt to give a sulfone is known in organic chemistry. It has been used to prepare dialkyl sulfones, alkyl aryl sulfones and even some simple diaryl sulfones. It is, however, reported to be sensitive to high temperatures. In addition, it does not always succeed, even with simple compounds. This reaction has heretofore never been used in the anthraquinone series. Many reactions which go readily in the simple benzene series fail when an anthraquinonyl halogen is involved. Such sulfones as have been known in the anthraquinone series have been prepared by the oxidation of a sulfide. Most of them have been alkyl sulfones, while those which were aryl anthraquinonyl sulfones containing solubilizing groups and were not usable as vat dyes.

I have found that when a halogeno anthraquinone, such as a bromo or chloro anthraquinone, is heated with an ammonium or alkali metal salt of an aryl sulfinic acid above 180° C. in a high boiling organic solvent, one obtains an aryl anthraquinonyl sulfone readily and without decomposition. It is most surprising that this reaction succeeds, in view of the known sensitivity of the reaction to high temperature. It is even more remarkable that the beta-haloanthraquinones react almost as readily as the alpha isomers.

I have further found that aryl anthraquinonyl sulfones free of water solubilizing groups, in which the anthraquinonyl radical is either unsubstituted or contains amino or acylamino substituents, are useful as new vat dyes or as intermediates for vat dyes or new azo dyes. The water solubilizing groups which must be absent from the dyes of our invention include hydroxy as well as the more common sulfonic and carboxylic groups.

In the process of my invention one may use aromatic sulfinates such as the alkali or ammonium salts of benzenesulfinic acid, o-toluenesulfinic acid, m-toluenesulfinic acid, p-toluenesulfinic acid, o-, m-, or p-chlorobenzenesulfinic acid, p-acetamidobenzenesulfinic acid, 3,5-dimethylbenzenesulfinic acid, 2-naphthalenesulfinic acid, 4-methoxybenzenesulfinic acid, 4-diphenylsulfinic acid, 2-thiophenesulfinic acid, and 2-dibenzothiophenesulfinic acid. In general, any organic sulfonyl chloride can be reduced by known methods to a sulfinic acid for use in my invention.

The anthraquinones which can be used in the process of my invention are those chloro and bromo compounds devoid of water solubilizing groups such as sulfonic or hydroxy. For example, one may use 1-chloroanthraquinone,
1-chloro-4-benzamido anthraquinone,
1-chloro-5-aminoanthraquinone,
1-chloro-5-benzamidoanthraquinone,
2-chloroanthraquinone,
1-bromoanthraquinone,
2-bromoanthraquinone,
2-methyl-1-chloroanthraquinone,
3-methyl-1-chloroanthraquinone,
1-chloro-6-(p-chlorophenyl)anthraquinone,
3-methyl-1-bromoanthraquinone,
4-methyl-1-chloroanthraquinone,
4-methyl-2-chloroanthraquinone,
6-methyl-2-chloroanthraquinone,
2-chloro-3-anthraquinonecarboxylic acid,
6-chloro-2-dimethylaminoanthraquinone,
7-chloro-2-aminoanthraquinone,
5,8-dimethyl-1-chloroanthraquinone,
1-bromo-2-aminoanthraquinone,
2-amino-1-bromoanthraquinone,
2-amino-3-bromoanthraquinone,
1-amino-4-bromoanthraquinone,
1-benzamido-4-bromoanthraquinone and the like.

Thus for example, when 1-chloroanthraquinone and sodium p-toluenesulfinate are stirred in diethyleneglycol ethyl ester for about five hours at 180–190° C. the following reaction takes place:

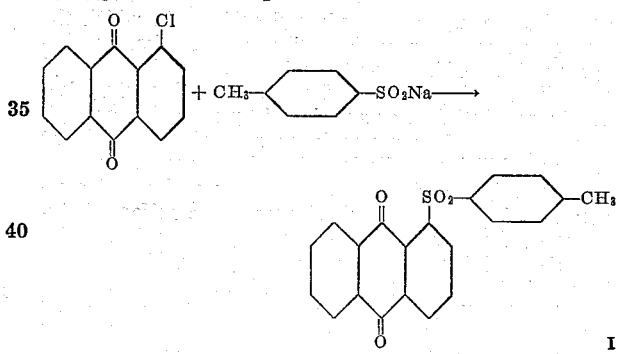

The same result is obtained when potassium p-toluenesulfinate is substituted for the sodium salt. Similarly the lithium, rubidium, caesium, and ammonium salts may be used. The sulfinate salt need not be prepared in advance but may be prepared in situ from the arylsulfinic acid and a base, such as a carbonate. When 1-chloro-5-benzamido anthraquinone is used the following reaction occurs.

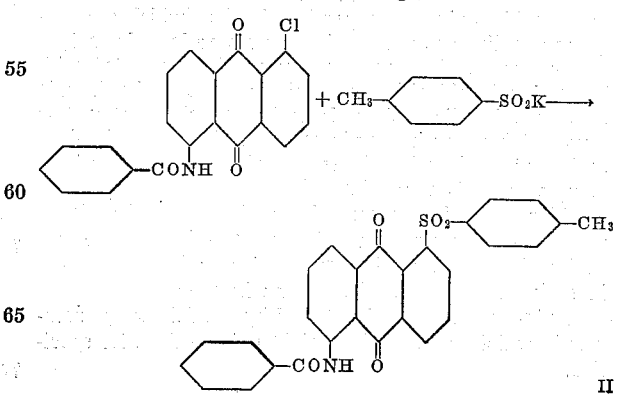

In a similar manner, instead of the 5-benzamido compound, the 4-benzamido compound may be used. But in this case debenzoylation occurs, giving the free amine instead of the benzoyl derivative. The latter is readily prepared by rebenzoylation of the product. Similar results are given by the 2-haloanthraquinone derivatives. Carboxy groups are lost under the reaction conditions. The 2-chloro-3-anthraquinonecarboxylic acid gives a sulfone as follows:

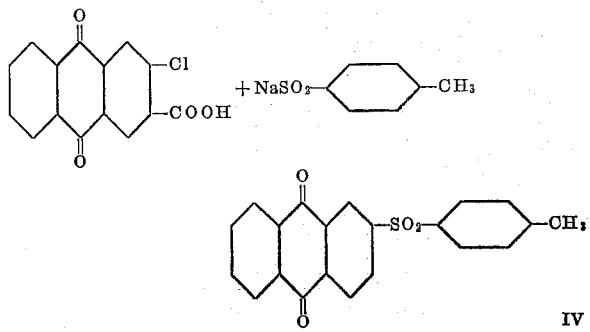

IV

The same sulfone is obtained from 2-chloroanthraquinone itself.

The solvents which may be used in the process of my invention include those which dissolve both the sulfinate and the halogenoanthraquinone. Such solvents include pyridine, the picolines, glycol, and glycol derivatives such as glycol ethyl ether and diethylene-glycol ethyl ether.

The new dyes and dye intermediates of my invention comprise the aryl anthraquinonyl sulfones in which the aryl group is an aromatic radical selected from carbocyclic radicals of less than three 6-membered rings, thienyl and dibenzothiopheneyl, and the anthraquinonyl radical can be unsubstituted or substituted by an amino or acylamino group. The molecule as a whole is devoid of water-solubilizing radicals. Especially usable as dyestuffs and dyestuff intermediates are the amino and acylamino aryl anthraquinonyl sulfones. The sulfone derivatives of 1-aminoanthraquinones may be acylated with a variety of monofunctional carboxylic acids, such as benzoyl chloride, the toluoyl chlorides, o-methoxybenzoyl chloride, 2,4-dimethoxybenzoyl chloride, p-chlorobenzoyl chloride, 2,4-dichlorobenzoyl chloride, p-bromobenzoyl chloride, m-(trifluoromethyl)benzoyl chloride, the naphthoyl chlorides, p-diphenylcarboxylic acid chloride and the like; in short, any functional derivatives of an aromatic carboxylic acid which do not contain substituents imparting solubility in water. These acylated aminoanthraquinone sulfones form a series of fast vat dyes of various shades of yellow. Similarly, the same aminoanthraquinone sulfones can be reacted with diketene in glacial acetic acid to give acetoacetyl derivatives which are useful as coupling components in the preparation of azo dyes and pigments. The sulfones may also be reacted with bifunctional acid chlorides such as those of isophthalic acid, terephthalic acid, and the like to give fast yellow dyes and bleed-resistant pigments. All these acylaminoanthraquinonyl aryl sulfones fall within the scope of the new compounds of my invention.

Older methods for preparing anthraquinonyl sulfones required the conversion of a halogeno anthraquinone to a sulfide, followed by oxidation. It is an advantage of my invention that it gives the sulfone in one step.

My invention can be illustrated by the following examples in which parts are by weight unless otherwise specified.

*Example 1*

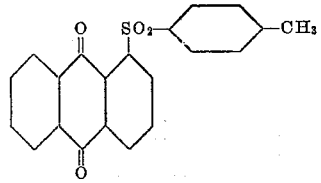

A mixture of 2.4 parts of 1-chloroanthraquinone and 2.0 parts of sodium p-toluenesulfinate in 75 parts by volume of diethylene glycol ethyl ether is stirred at 180–190° C. until the reaction is complete. The mixture is then cooled and diluted with half its volume of water. Further cooling and filtration gives the product, which may be recrystallized from acetic acid or xylene. Results are similar if diethylene glycol methyl ether is used as solvent instead of the ethyl ether.

*Example 2*

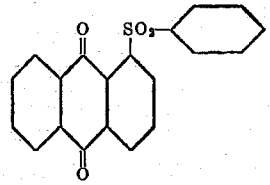

If in Example 1, instead of sodium p-toluene-sulfinate, an equivalent amount of sodium benzenesulfinate is used, the product obtained is phenyl 1-anthraquinonyl sulfone.

*Example 3*

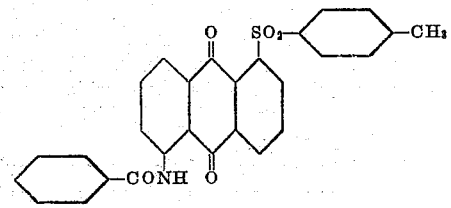

A mixture of 1.8 parts of 5-benzamido-1-chloroanthraquinone and 1.0 part of sodium p-toluene-sulfinate in 25 parts of diethylene glycol ethyl ether is stirred under reflux until the reaction is complete. It is then cooled partially, diluted with about 3 parts of water, cooled to room temperature and filtered. The product is then crystallized from 40 parts of xylene and may be further crystallized from acetic acid or xylene.

*Example 4*

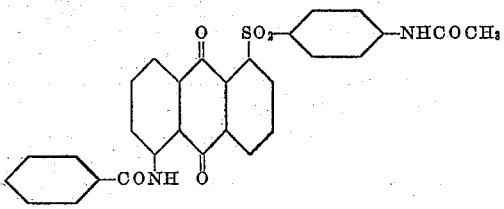

If, in Example 3, instead of sodium p-toluene-sulfinate, an equivalent amount of sodium p-acetamido-benzenesulfinate is used, the product obtained is p-acetamidophenyl 5-benzamido-1-anthraquinonyl sulfone.

When sodium 2-thiophenesulfinate or sodium 2-dibenzothiophenesulfinate is used in equivalent quantity in place of the acetamidobenzene sulfinate, the corresponding 2-thienyl or 2-dibenzothiopheneyl 5-benzamido-1-anthraquinonyl sulfone is obtained.

Example 5

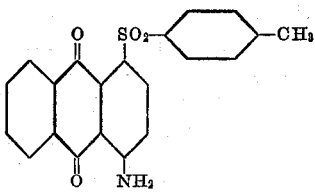

A mixture of 5.0 parts of 4-benzamido-1-chloroanthraquinone, 3.0 parts of sodium p-toluenesulfinate and 50 parts by volume of diethyleneglycol ethyl ether is stirred and refluxed until the reaction is complete. It is cooled slightly, diluted with 5 parts of water, cooled to room temperature and the product isolated by filtration. The product is washed with a little methanol and crystallized from 500 parts by volume of xylene.

Example 6

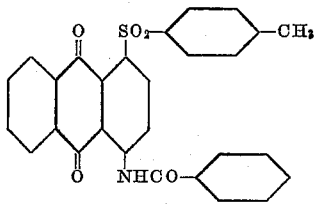

The N-benzoyl derivative of the sulfone of Example 3 is prepared by refluxing with benzoyl chloride in o-dichlorobenzene. The produce may be crystallized from acetic acid.

Example 7

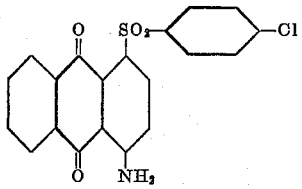

If, in Example 5, instead of sodium p-toluenesulfinate, an equivalent amount of potassium p-chlorobenzenesulfinate is used, the product obtained is p-chlorophenyl 4-amino-1-anthraquinonyl sulfone.

Example 8

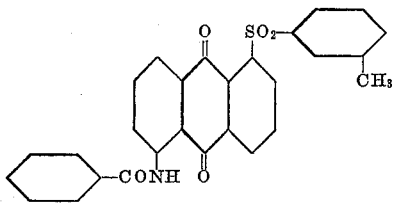

If, in Example 3, instead of sodium p-toluenesulfinate, an equivalent amount of sodium m-toluenesulfinate is used, the product obtained is m-tolyl 5-benzamido-1-anthraquinonyl sulfone.

Example 9

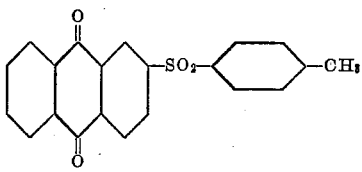

A mixture of 2.9 parts of 2-chloro-3-anthraquinonecarboxylic acid, 6.0 parts of sodium p-toluenesulfinate and 75 parts by volume of diethylene glycol ethyl ether is stirred at reflux at 190° until the reaction is complete. The product is isolated by cooling, diluting and filtering. It may be purified by crystallization from acetic acid or pentasol.

Example 10

If in Example 9, the 2-chloro-3-anthraquinonecarboxylic acid is replaced by an equivalent quantity of 2-chloroanthraquinone, the same sulfone is found in the reaction product.

When an equivalent amount of one of the following anthraquinones is substituted for the 2-chloroanthraquinone, the corresponding p-tolyl sulfone of the anthraquinone is obtained, the sulfone group replacing the halogen.

3-methyl-1-chloroanthraquinone
6-chloro-2-dimethylaminoanthraquinone
7-chloro-2-aminoanthraquinone
2-amino-3-bromoanthraquinone
Ethyl 1-chloro-2-anthraquinonecarboxylate
4-methoxy-1-chloroanthraquinone

Example 11

30 parts of the product of Example 5 and 20 parts of diphenyl-4-carboxylic acid are suspended in 360 parts of nitrobenzene. After the addition of 16 parts of thionyl chloride the whole mixture is heated while stirring to about 135° C. over a period of time. The mixture is then stirred at 130–135° C. until the reaction is complete. The dyestuff which forms is separated by filtration, washed with alcohol and dried. It dyes cotton yellow.

Similarly, an equivalent amount of m-(methylsulfonyl)-benzoic acid or m-(trifluoromethyl)benzoic acid is used in place of the diphenyl carboxylic acid. The resulting dyes are much redder than the diphenyl compound.

Example 12

30 parts of the product of Example 5 are suspended in 200 parts of glacial acetic acid. Into the suspension is introduced dropwise at 65–70° C. with stirring, 17 parts of diketene. The whole is then stirred at this temperature until the reaction is substantially complete. The reaction mixture is allowed to cool and the reaction product is isolated by filtration. This compound, 1-aceto acetylamino-4-p-toluenesulfonylanthraquinone, can be used as a coupling component with diazo compounds to give useful azo dyes.

I claim:

1. A process of preparing an aryl anthraquinonyl sulfone in which the aryl group is an aromatic radical selected from the group consisting of carbocyclic radicals of less than three 6-membered rings, thienyl and dibenzothiopheneyl radicals, which comprises heating 1-chloro-4-benzamidoanthraquinone with an aryl sulfinate salt of a cation selected from the group consisting of ammonium and alkali metals, the said aryl radical being free of water solubilizing groups other than the sulfinate, in diethylene glycol ethyl ether above 180° C.

2. A process of preparing an aryl anthraquinonyl sulfone in which the aryl group is an aromatic radical selected from the group consisting of carbocyclic radicals of less than three 6-membered rings, thienyl and dibenzothiopheneyl radicals, which comprises heating 1-chloroanthraquinone with an aryl sulfinate salt of a cation selected from the group consisting of ammonium and alkali metals, the said aryl radical being free of water solubilizing groups other than the sulfinate, in a high boiling organic solvent above 180° C.

3. The process of claim 2 in which the solvent is diethylene glycol ethyl ether.

4. A process of preparing an aryl anthraquinonyl sulfone in which the aryl group is an aromatic radical selected from the group consisting of carbocyclic radicals of less than three 6-membered rings, thienyl and dibenzothiopheneyl radicals, which comprises heating 2-chloro-3-anthraquinone carboxylic acid with an aryl sulfinate salt of a cation selected from the group consisting of ammonium and alkali metals, the said aryl radical being free of water solubilizing groups other than the sulfinate, in a high boiling organic solvent above 180° C.

5. The process of claim 4 in which the solvent is diethylene glycol ethyl ether.

6. An aryl anthraquinonylsulfone free of water solubilizing groups in which the aryl group is a monocyclic, carbocyclic 6-membered ring and the anthraquinonyl radical is 4-amino-1-anthraquinonyl.

7. p-Tolyl 1-anthraquinonyl sulfone.
8. p-Tolyl 2-anthraquinonyl sulfone.
9. p-Tolyl 4-amino-1-anthraquinonyl sulfone.
10. p-Tolyl 4-benzamido-1-anthraquinonyl sulfone.
11. p-Tolyl 5-benzamido-1-anthraquinonyl sulfone.

References Cited in the file of this patent

UNITED STATES PATENTS

| 2,716,654 | Westlake et al. | Aug. 30, 1955 |
| 2,738,354 | Kern et al. | Mar. 13, 1956 |

FOREIGN PATENTS

| 16,272 | Great Britain | 1910 |

OTHER REFERENCES

Gilman: "Organic Chemistry," pages 874–875, vol. I, 1943.

Migrdichian: "Organic Synthesis," vol. II, pages 1710–1711, 1957.